US006665633B2

(12) United States Patent  
Fioravanti et al.

(10) Patent No.: US 6,665,633 B2
(45) Date of Patent: Dec. 16, 2003

(54) RELATION OF ROTATIONAL VIBRATION STIMULI TO PERFORMANCE OF A HARD DISC DRIVE

(75) Inventors: Louis J. Fioravanti, Boulder, CO (US); Kenneth L. Pottebaum, Yukon, OK (US); Michael P. Foster, Boulder, CO (US); Glen D. Almgren, Johnstown, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 37 days.

(21) Appl. No.: 09/951,565

(22) Filed: Sep. 12, 2001

(65) Prior Publication Data

US 2002/0123860 A1 Sep. 5, 2002

Related U.S. Application Data

(60) Provisional application No. 60/258,787, filed on Dec. 29, 2000, provisional application No. 60/258,785, filed on Dec. 29, 2000, and provisional application No. 60/258,786, filed on Dec. 29, 2000.

(51) Int. Cl.[7] .................................................. G06F 11/00
(52) U.S. Cl. ..................... 702/182; 702/94; 702/113; 702/141
(58) Field of Search ............................ 702/33, 38, 44, 702/54, 56, 57, 94, 113, 141, 182; 434/45; 600/300; 706/45; 356/606; 360/31, 69

(56) References Cited

U.S. PATENT DOCUMENTS

| 3,674,995 A | 7/1972 | Kendall .................... 235/151.1 |
| 3,679,880 A | 7/1972 | Carver .................... 235/151.34 |
| 4,187,726 A | 2/1980 | Olmstead ..................... 73/660 |
| 4,408,285 A | 10/1983 | Sisson et al. ................ 364/508 |
| 4,520,674 A | 6/1985 | Canada et al. ................. 73/660 |
| 5,602,757 A | 2/1997 | Haseley et al. ........ 364/551.01 |
| 5,736,640 A | 4/1998 | Farine et al. ............. 73/504.12 |
| 5,808,903 A | 9/1998 | Schiltz et al. ................ 364/508 |
| 5,822,450 A | 10/1998 | Arakawa et al. ............. 382/152 |
| 5,837,885 A | 11/1998 | Goodbread et al. ............. 73/32 |
| 5,847,658 A | 12/1998 | Irie et al. ..................... 340/683 |
| 5,850,576 A | 12/1998 | Matsuzawa ................... 396/55 |
| 5,915,278 A | 6/1999 | Mallick ........................ 73/658 |
| 5,978,752 A | * 11/1999 | Morris ....................... 702/186 |
| 6,006,164 A | 12/1999 | McCarty et al. .............. 702/56 |
| 6,052,278 A | 4/2000 | Tanzer et al. ................ 361/685 |
| 6,063,046 A | * 5/2000 | Allum ......................... 600/595 |
| 6,065,332 A | 5/2000 | Dominick ................. 73/152.47 |
| 6,088,185 A | 7/2000 | Ratliff et al. ............. 360/77.03 |
| 6,101,058 A | 8/2000 | Morris ......................... 360/69 |
| 6,101,876 A | 8/2000 | Brooks et al. ................. 73/468 |
| 6,154,361 A | 11/2000 | Anderson et al. ........... 361/685 |
| 6,164,614 A | * 12/2000 | Lim et al. .................... 248/634 |
| 6,222,336 B1 | * 4/2001 | Mckenzie et al. .......... 318/448 |
| 6,262,550 B1 | * 7/2001 | Kliman et al. .............. 318/565 |
| 6,275,352 B1 | 8/2001 | Tadepalli et al. ........ 360/97.02 |
| 6,493,689 B2 | * 12/2002 | Kotoulas et al. .............. 706/23 |
| 6,526,008 B1 | * 2/2003 | Caponetto et al. ....... 369/43.35 |

* cited by examiner

Primary Examiner—Marc S. Huff
Assistant Examiner—Felix Suarez
(74) Attorney, Agent, or Firm—Fellers, Snider, et al.

(57) ABSTRACT

In relating rotational vibration stimuli of a mechanical mounting environment to the performance of a disc drive, a method and system are provided of which the steps are selecting a sample disc drive of a drive species and mounting the sample disc drive within the mechanical mounting environment; attaching an accelerometer to the sample disc drive for measuring rotational vibration; inducing a predetermined rotational vibration stimuli into the mechanical mounting; collecting vibration data with the accelerometer for use in determining the rotational vibration index for the mechanical mounting environment; providing a rotational vibration index for the drive species for comparison with the determined rotational vibration index; and comparing the rotational vibration index calculated for the mechanical mounting environment with the rotational vibration index of the drive species to relate the rotational vibration stimuli of the mechanical mounting environment to the performance of the sample disc drive.

30 Claims, 5 Drawing Sheets

RELATION OF ROTATIONAL VIBRATION STIMULI TO PERFORMANCE OF A HARD DISC DRIVE

RELATED APPLICATIONS

This application claims priority to U.S. Provisional Application No. 60/258,787 filed Dec. 29, 2000, entitled Software Algorithm to Relate RV Response to HDD Performance, to U.S. Provisional Application No. 60/258,785 filed Dec. 29, 2000, entitled HDD Chassis Vibration Control and Monitor, and to U.S. Provisional Application No. 60/258,786 filed Dec. 29, 2000, entitled HDD Test Chamber Vibration Monitor.

FIELD OF THE INVENTION

This invention relates generally to the field of data storage devices, and more particularly, but not by way of limitation, to the relation of rotational vibration stimuli to the performance of hard disc drives.

BACKGROUND

Disc drives are used for data storage in modern electronic products ranging from digital cameras to computer systems and networks. Typically, a disc drive includes a mechanical portion, or head disc assembly (also referred to as an HDA), and electronics in the form of a printed circuit board assembly (PCB), mounted to an outer surface of the head disc assembly. The PCB controls the HDA functions and provides an interface between the disc drive and its host.

Generally, a head disc assembly comprises one or more magnetic discs affixed to a spindle motor assembly for rotation at a constant speed, an actuator assembly supporting an array of read/write heads that traverse generally concentric data tracks radially spaced across the disc surfaces and a voice coil motor providing rotational motion to the actuator assembly. The continued demand for disc drives with improved reliability and operating efficiencies has caused disc drive manufacturers to seek ways to increase the ability of disc drives to operate in the presence of rotational vibration stimuli, while simultaneously reducing the exposure of the disc drive to rotational vibration during execution of data transfer functions.

Disc drives can suffer degraded data throughput performance and reduced data integrity from exposure to rotational vibration stimuli. A disc drive is most susceptible to rotational vibration stimuli because of the rotary actuator positioning system. The more rotational vibration stimuli present in the disc drive's operational environment, the harder it is for the actuator to track, follow and seek settle. One of the primary generators of rotational vibration stimuli is the actuator itself. As the actuator accelerates/decelerates, the base plate has an equal and opposite reaction torque. It is this reaction torque that can be amplified by the mechanical mounting environment of a disc drive, such as a chassis supporting the disc drive. Amplification of the reaction torque can affect the operating performance of the source disc drive and can even affect the operating performance of adjacent disc drives secured within the same mechanical mounting environment.

High rotational vibration (RV) levels can occur in the chassis of disc drive array systems, mass storage units, desktop systems and notebook computers. Disc drive design options available to disc drive designers, for reducing sensitivity to rotational vibrations, are predominantly limited to improvements in the servo system of the disc drive. Within the servo system, the areas generally available to the disc drive designer for enhancements that reduce the disc drive's sensitivity to rotational vibration are incorporation of compensation algorithms and faster processors for shorter recovery times from a rotational vibration stimuli event.

Chassis designers generally have more options available to them for reducing or suppressing rotational vibrations transferred from the chassis to the disc drive than disc drive designers have in dealing with rotational vibrations transferred into the disc drive from the chassis. Specifically, chassis designers can move the response frequency of the chassis through mechanical tuning techniques. Such techniques include altering a configuration of support members of the chassis, changing the mass of the chassis through addition or removal of material, selecting alternate materials and through mechanical dampening techniques such as the use of constrained layer dampening between members of the chassis. Working together, disc drive designers and chassis designers can successfully deal with the potential rotational vibration problem.

While there are other testing methods that allow for monitoring vibration of various devices, a method for constantly monitoring multiple disc drives during rotational vibration testing and condensing, into a single index, frequency domain data collected during that testing is currently unavailable. Provision of a single index, for comparison against a predetermined value, would be useful in helping disc drive designers and chassis designers focus on developing optimum solutions to rotational vibration stimuli experienced by disc drive. A single index would also aid in monitoring and verifying the effects of changes, made to either the disc drive or the mechanical mounting environment, relative to the level of rotational vibration stimuli experienced by the disc drive mounted in the particular mechanical mounting environment resulting from the change.

Therefore, challenges remain and a need persists for techniques that relate overall energy and frequency content of rotational vibration stimuli experienced by the mechanical mounting environment of the disc drive with measured performance of the disc drive. It is to this and other features and advantages set forth herein that embodiments of the present invention are directed.

SUMMARY OF THE INVENTION

The present invention provides an apparatus and associated method for relating rotational vibration stimuli of a mechanical mounting environment to performance of a disc drive and includes selecting a sample disc drive of a drive species and mounting the sample disc drive within a selected mechanical mounting environment; attaching an accelerometer to the sample disc drive for measuring rotational vibration; inducing a predetermined rotational vibration stimuli into the mechanical mounting; collecting vibration data with the accelerometer for use in determining a rotational vibration index for the mechanical mounting environment with the selected disc drive mounted into the mechanical mounting environment; providing a predetermined rotational vibration index for the drive species for comparison with the determined rotational vibration index; and comparing the rotational vibration index calculated for the mechanical mounting environment with the rotational vibration index of the drive species to relate the rotational vibration stimuli of the mechanical mounting environment to the performance of the sample disc drive.

Additionally, the apparatus and associated method provides a test system for predicting performance of a disc drive of a drive species mounted in a mechanical mounting environment. The test system includes a pair of accelerometers attached to the disc drive for measuring response of the disc drive to a rotational vibration stimulus. Communicating with the accelerometers is a computer with a data acquisition card for acquiring and analyzing the response of the disc drive to the rotational vibration stimuli. The test system also includes a storage device communicating with the computer for saving measurements made by the accelerometers measuring the response of the disc drive to the rotational vibration stimuli imparted on the mechanical mounting environment. The test system further includes software incorporating a rotational vibration index function programmed into the computer and communicating with the data acquisition card to compute the rotational vibration index for the mechanical mounting environment with the disc drive mounted to the mechanical environment.

These and various other features and advantages, which characterize the present invention, will be apparent from a reading of the following detailed description in view of the associated drawings.

DETAILED DESCRIPTION

Figure 1:
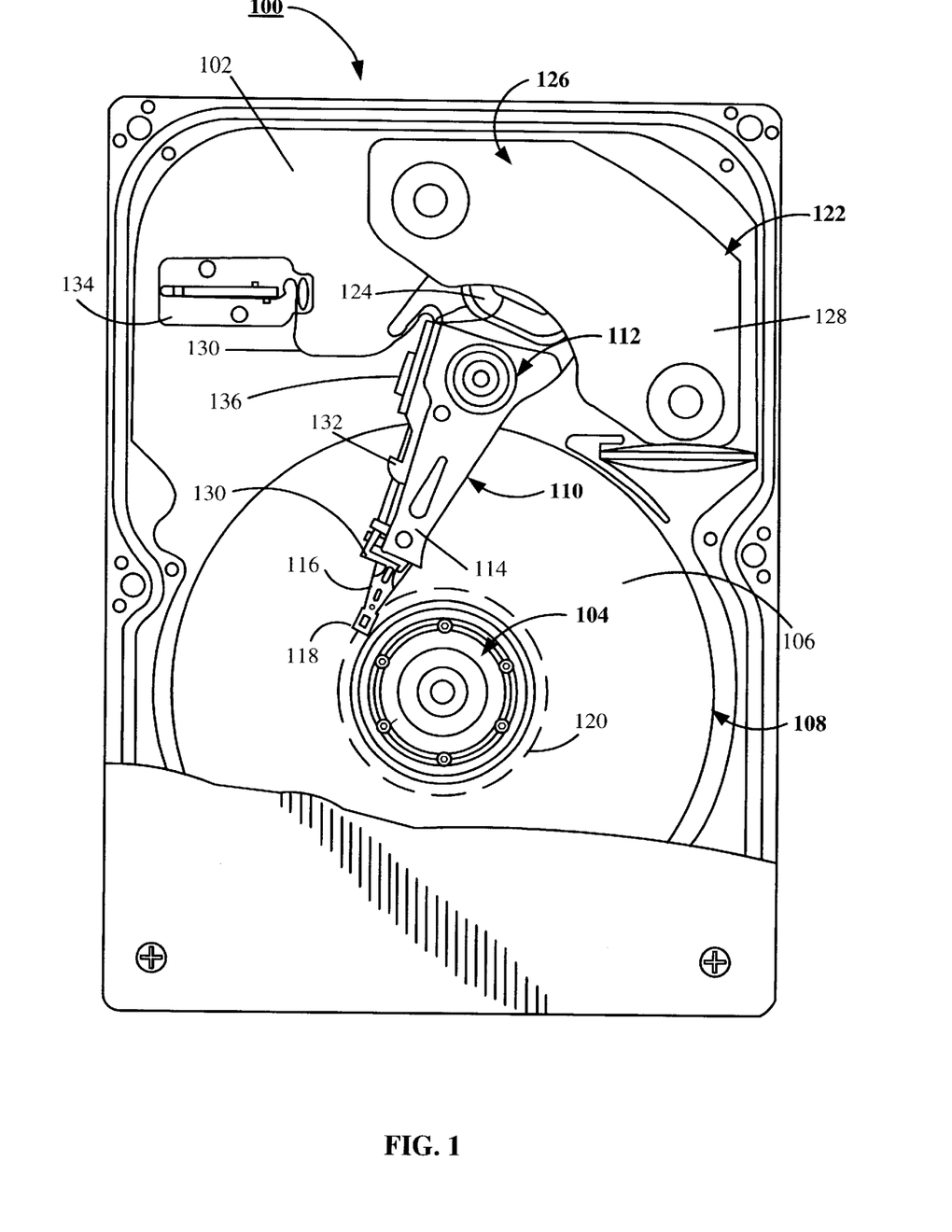
FIG. 1 is a top plan view of a typical disc drive having the cover thereof partially cutaway and used for determining an RV index for the mechanical mounting environment of the disc drive in accordance with the present invention.

Referring to the drawings in general, and more particularly to FIG. 1, shown therein is a top view of a disc drive 100 constructed in accordance with an embodiment of the present invention. Numerous details of and variations for the construction of the disc drive 100 are not included in the following description as such are well-known to those skilled in the art and are believed to be unnecessary for the purpose of describing embodiments of the present invention.

The disc drive 100 includes a basedeck 102 supporting various disc drive components, including a spindle motor assembly 104. The spindle motor assembly 104 supports an axially aligned rotatable disc surface 106 forming a disc stack 108, also referred to as a disc pack. Adjacent the disc stack 108 is an actuator assembly 110 (also referred to as an E-block or a head stack assembly, HSA), which rotationally pivots about a primary actuator motor support, or bearing assembly, 112. The head stack assembly 110 includes an actuator arm 114 that supports a load arm 116 that in turn supports a read/write head 118 adjacent the rotatable disc surface 106. The rotatable disc surface 106 is divided into concentric data tracks 120 (only one depicted) over which the read/write head 118 is positionably located, and on which head position control information are written to embedded servo sectors (not separately depicted). The embedded servo sectors separate a plurality of data sectors (not separately depicted) used for storing data.

The term "servoing," also referred to as position-controlling, as used herein means maintaining control of the read/write head 118 relative to the rotating disc surfaces 106 during operation of the disc drive 100. When servoing to or on data track 120, the head stack assembly 110 is controllably positioned by a primary actuator motor 122 (also referred to herein as a voice coil motor assembly, VCM). The voice coil motor assembly includes an actuator coil 124 immersed in the magnetic field generated by a magnet assembly 126. A magnetically permeable flux path is provided by a pair of steel plates 128, also referred to as pole pieces, mounted above and below the actuator coil 124 to complete a magnetic circuit of the voice coil motor 122.

To provide the requisite electrical conduction paths between the read/write head 118 and disc drive read/write circuitry (not shown), read/write head conductors (not separately shown) are affixed to a read/write flex circuit 130. The read/write flex circuit 130 is routed from the load arms 116 along the actuator arms 114 into a flex circuit containment channel 132, and then to a flex connector body 134. The flex connector body 134 supports the read/write flex circuit 130 during passage of the read/write flex circuit 130 through the basedeck 102 and into communication with a disc drive printed circuit board assembly (PCBA, not shown) mounted to the underside of the basedeck 102. The read/write flex circuit 130 also supports read/write signal circuitry, including preamplifier/driver (preamp) 136 used to condition read/write signals passed between the read/write circuitry (not shown) and the read/write head 118. The printed circuit board assembly supports the read/write circuitry, also known as a read/write channel (not shown) that controls the operation of the read/write head 118. The printed circuit board assembly also supports interface and control circuitry for the disc drive 100.

The term "drive species" as used herein shall mean all disc drives from a population of disc drives that are substantially the same as disc drive 100. In other words, all disc drives of a drive species will have, within applicable specified engineering tolerances, the same mechanical configuration, operating characteristics and mass, and also, they will also have functionally equivalent printed circuit board assemblies, the components of which can freely be interchanged between disc drives while preserving the operating parameters of the engineering specifications for the disc drives.

Figure 2:
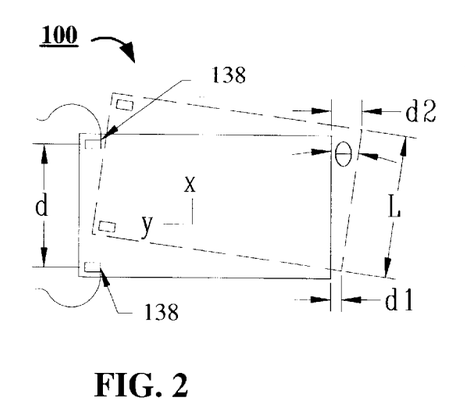
FIG. 2 is an outline plan view of the disc drive of FIG. 1 having a pair of translational accelerometers attached thereto.

As shown in FIG. 2, a pair of translational accelerometers 138 are attached to the disc drive 100 for the determination of angular acceleration of the disc drive 100. As an aid to the reader's understanding, it is suggested that one visualize measuring the angular displacement of the disc drive 100, and that for small rotations, the angular displacement will be given by:

$$\theta = \frac{d2 - d1}{L}, \text{ units of radians}$$

The angular acceleration is obtained by the $2^{nd}$ time derivative, which will give the following:

$$\ddot{\theta} = \frac{\ddot{d}_2 - \ddot{d}_1}{L}, \text{ units of } \frac{\text{radians}}{\sec^2}$$

In practice, the angular acceleration is measured as:

$$\alpha = 3864 \frac{(a_2 - a_1)}{d}, \text{ units of, } \frac{\text{radians}}{\sec^2},$$

in which the units are as follows:

$\alpha \equiv$ angular acceleration, units of $\frac{\text{radians}}{\sec^2}$ $a_1, a_2 \equiv$ translational acceleration, units of $Gs$ $d \equiv$ spacing between accelerometers, units of inches $386.4 \equiv$ conversion from $Gs$ to $\frac{\text{radians}}{\sec^2}$ The precise placement of the accelerometers 138 on the disc drive 100 is not believed to be determinative, provided the accelerometers 138 are mounted in a common plane perpendicular to the axis of rotation of the spindle motor assembly 104 (FIG. 1), because the disc drive 100 is a rigid body and any angular displacement, or acceleration, is the same throughout this common plane. When working with mathematical computations of angular displacements and accelerations, it is advised that the math operations be carried out in the time domain.

When conducting acceleration measurements to determine a tolerance of the disc drive 100 to rotational vibration, a traditional approach of utilizing an analyzer produced by Hewlett-Packard (HP35670A) has been found to be of particular value for taking and analyzing acceleration data detected by the translational accelerometers 138. The HP35670A analyzer has functions to perform the Fast Fourier Transform on math operated time-domain data. When collecting data from the translational accelerometers 138, delay between samples of data should be as small as possible to avoid phase errors. The HP35670A analyzer takes measurements on different channels simultaneously as a means of avoiding phase errors.

The equipment found useful for rotational vibration tolerance analysis includes the following:

An HP 35670A analyzer with:
  8 MB RAM (Basic Unit 4 MB);
  Firmware revision A.00.15,
    Provides measurement "State" file compatibility for sharing of setup files, and
    Firmware upgradeable by floppy: P/N 35670U Option UE2; and
Two (2) Charge amplifiers and two (2) Endevco Model 22 translational accelerometers, mounted in a common plain of the disc drive 100 to detect Z-axis rotational vibration.

The susceptibility of the disc drive 100 to rotational vibration stimuli induced in a mechanical mounting environment for the disc drive 100 is specific to each drive species. An occurrence of non-recoverable errors during write operations of the disc drive 100 resulting from a rotational vibration stimuli induced in the mechanical mounting environment for the disc drive provides the measurement standard for gauging performance of the disc drive 100 to rotational vibration of the mechanical mounting environment. Typically, as the amplitude of rotational vibration increases in the mechanical mounting environment, data throughput of the disc drive 100 decreases because the disc drive 100 encounters an increasing number of errors caused by the rotational vibration.

Figure 3:
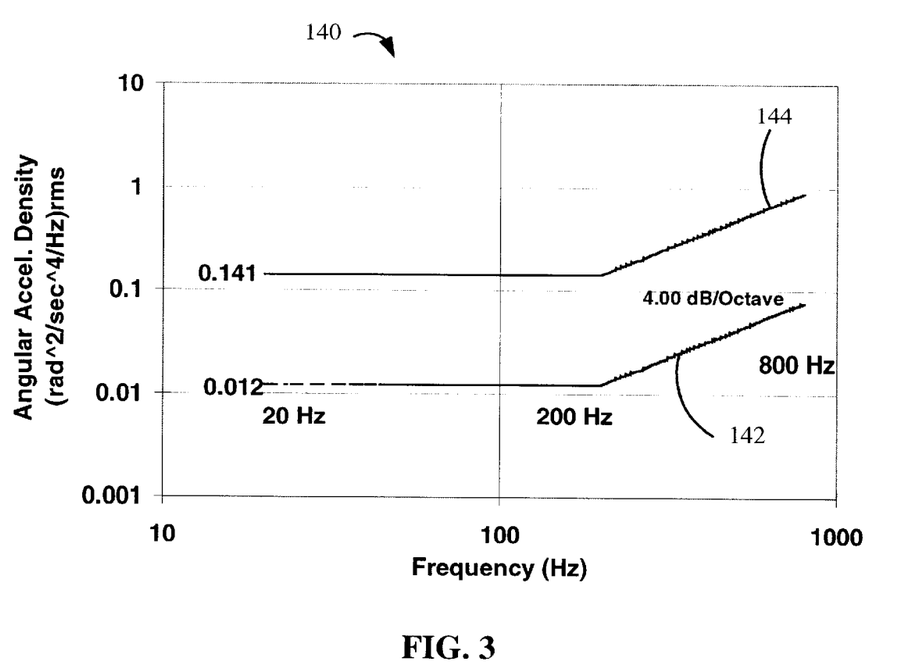
FIG. 3 is a power spectral density profile of a drive species in which the disc drive of FIG. 1 is a member.

FIG. 3 shows an empirically derived power spectral density versus frequency graph 140, also known as a power spectral density profile, for a particular drive species. The power spectral density versus frequency graph 140 includes a tolerance level designated as a normal criterion 142 and a tolerance level designated as an abnormal criterion 144.

Representative disc drives (such as the disc drive 100 of FIG. 1) of a particular drive species are predicted to operate absent an occurrence of an error when encountering the power spectral density of a mechanical mounting environment below the level indicated by the normal criterion 142. The same representative disc drives are predicted to operate absent any non-recoverable errors when encountering the power spectral density of a mechanical mounting environment below the level indicated by the abnormal criterion 144. Above the abnormal criterion 144, non-recoverable errors are expected to occur, and between the normal criterion 142 and the abnormal criterion 144, a degradation in operating performance of the representative disc drive of the particular drive species is predictable.

The drive level rotational vibration (Z-axis) criterion for the drive species underlying the power spectral density vs. frequency graph 140 is as follows:

| | Normal Criterion | Abnormal Criterion |
|---|---|---|
| Definition | No errors reported. | No non-recoverable errors reported. |
| RMS Level | 5.3 (Rad/s$^2$)$_{rms}$ | 17.9 (Rad/s$^2$)$_{rms}$ |
| 20–200 Hz | 0.012 (Rad$^2$/s$^4$/Hz)$_{rms}$ | 0.141 (Rad$^2$/s$^4$/Hz)$_{rms}$ |
| 200–800 Hz | 4.00 dB/Octave | 4.00 dB/Octave |
| (where RMS is root mean square) | | |

Units of power spectral density (PSD) are expressed in $(Rad^2/Sec^4)_{rms}/Hz$. Translational vibration units are expressed in G's of force. For random vibration testing, power spectral density, or the amount of power content of the vibration, is expressed as $G_{rms}^2/Hz$. The units of PSD have the frequency or hz in the denominator so that the results are independent of frequency resolution. Since PSD units represent power, values such as G's and V's are squared to make them proportional to power units, such as $W=V^2/R$. An overall RMS level, or energy level, is expressed as $G_{rms}$. For rotational vibration, the units are expressed as Rad/Sec$^2$. For random rotational vibration testing, the power spectral density units are expressed as $[(Rad/Sec^2)_{rms}]^2/Hz$ or $(Rad^2/Sec^4)_{rms}/Hz$, and the overall RMS level is expressed as $(Rad/Sec^2)_{rms}$ For each drive species, a rotational vibration index function is empirically developed to provide a system level rotational vibration index criteria. The rotational vibration index function takes the form of equation (1):

$$RV\ Index \equiv 10 * \log\left(\frac{R^2 * \sqrt{DS}}{10^{-6}}\right) \quad (1)$$

where $$DS \equiv \frac{\int D(f)df}{\int df} = \frac{\int D(f)df}{780} = \frac{4 * \sum D(f)}{780},$$

and $$R \equiv \frac{RMS_{System}}{RMS_{Spec}}$$

and $$D \equiv \begin{cases} \dfrac{\sqrt{PSD_f^4 - PSD0_f^4}}{PSD0_f^2}, & \text{if } PSD_f \geq PSD0_f \\ -\dfrac{\sqrt{PSD0_f^4 - PSD_f^4}}{PSD0_f^2}, & \text{if } PSD_f < PSD0_f \end{cases}$$

and $$PSD0_f \equiv \frac{PSD_{Spec,f}}{4}$$

The rotational vibration index function was developed by determining a normal operating rotational vibration (RV) threshold using 12 random vibration profiles for a drive species. Random vibration testing differs from swept sine testing by applying all frequencies simultaneously rather than a single frequency at a time. An iterative approach was used to determine a function that would give approximately the same index for the 12 profiles.

An underlying assumption is that the same weighting function is valid for abnormal self-excitation criteria as well as for an idle criteria, and the resultant value of the rotational vibration index function is a non-dimensional number expressed in decibels. RV indices guideline values are determined for the drive species and used as a comparison against RV indices derived from the testing of specific disc drives of the drive species mounted in a mechanical mounting environment such as a computer system, test chamber system or a file server.

For example, to determine an RV index for an array housing, a plurality of sample disc drives drawn from a population of disc drives of the same species is determined through testing. The determined RV index for the array system is compared with guideline values for the drive species to predict if errors are expected to occur when mounting drives of that particular species into the mechanical mounting environment or chassis of the array.

An RMS level is defined as the square root of the area under the power spectral density profile, such as 140. For a power spectral density profile consisting of a constant level and an increasing ramp, the formula is:

$RMS^2$=Area under Constant Portion+Area under Ramp Portion.

The formula for calculating points along a dB/Octave slope is given by equation (2):

$$G_i = G_o * 10^{\left(\frac{m*\log\left(\frac{f_i}{f_o}\right)}{10*\log(2)}\right)} \quad (2)$$

Where:

$f_i$=Frequency (hz) at a point on the ramp.
$f_o$=Frequency (hz) at start of ramp up.

$G_i$, $G_o$=Rotational acceleration $(Rad^2/Sec^4)_{rms}$/Hz at $f_i$ and $f_o$ respectively
m=Positive slope (dB/Octive) from $f_i$ to $f_o$.
$\log(x)=\log_{10}(x)$ The formula for calculating the area under a positive dB/Octave slope is given by equation 3:

$$G_{rms}^2 = \int_{f_o}^{f_i} G_o * 10^{\left(\frac{m*\log\left(\frac{f_i}{f_o}\right)}{10*\log(2)}\right)} df$$

Which can be restated as:

$$G_{rms}^2 = \frac{G_o * f_o}{.33219 * m + 1} * \left[\left(\frac{f_i}{f_o}\right)^{(.33219*m+1)} - 1\right]$$

Figure 4:
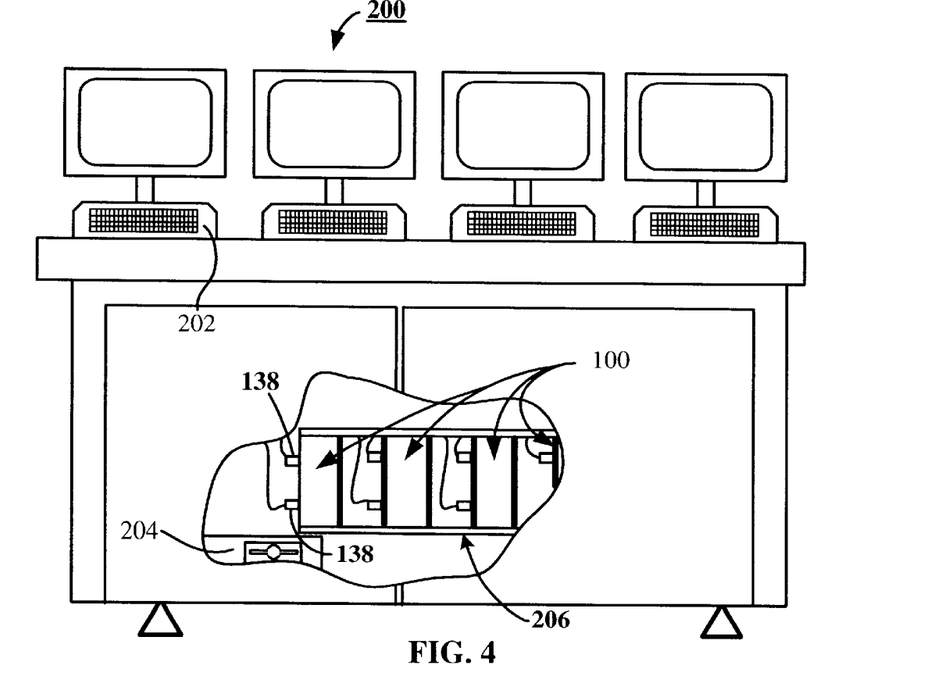
FIG. 4 is an elevational view of a test chamber with a plurality of test systems used for testing a plurality of disc drives of the type shown in FIG. 1.

Continuing with FIG. 4, shown therein is a preferred embodiment of a test chamber 200 supporting a plurality of test systems 202, each test system 202 including a data acquisition card (not separately shown) such as a National Instruments DAQ card-AI-16E-4 mounted in a personal computer. The test chamber 200 further supports a process computer 204 used to control activities of a plurality of disc drives 100. Each disc drive 100 is mounted in a test system chassis 206 and supports a pair of translational accelerometers 138. The test system 202 is programmed to communicate with each translational accelerometer 138, and display information on the monitor of the test system 202. The software program for the test system 202 is written in Labview and includes the RV index function, which is used to determine a rotational vibration index for the test chamber 200. Measurements of rotational vibration experienced by each of the disc drives 100 in the test chamber 200 are taken by the pair of translational accelerometers 138 and passed to the data acquisition card for processing and comparison to the rotational vibration index for the drive species (not shown).

In preparing the test chamber 200 for analyzing rotational vibration indices, the test system 202 undergoes a software resident calibration process. During the process of calibrating the test system 202, power is applied to the test system 202 to verify the operability of each pair of translational accelerometers 138. Next, a calibrated rotational vibration stimuli is induced into the pair of translational accelerometers 138 while monitoring an output signal from each accelerometer 138 to determine a maximum peak value reported by each of the accelerometers 138. To assure the pair of accelerometers 138 are reasonably matched, the software resident calibration process analyzes the maximum peak value reported by each of the accelerometers 138 by comparing by calculating a ratio of the cube of the maximum peak value reported by a first of the pair of accelerometers to the cube of the maximum peak value reported by a second of the pair of accelerometers. The software resident calibration process then verifies the calculated ratio to be within predetermined limits of between about 0.10 and 99 (plus or minus one order of magnitude). Additionally, while utilizing the test chamber 200 for rotational vibration testing, the software resident calibration process is continually running in the background.

Figures 5, 6:
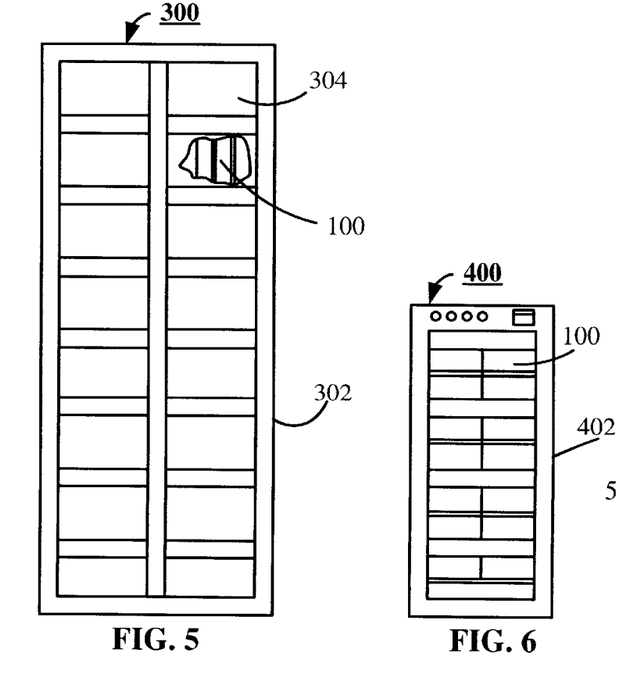
FIG. 5 is an elevational view of a mass storage unit supporting a plurality of disc drives of the type shown in FIG. 1.
FIG. 6 is an elevational view of a server supporting a plurality of disc drives of the type shown in FIG. 1.

FIG. 5 shows a mass storage unit 300 supporting a plurality of disc drives 100. The mass storage unit 300 includes a frame system 302 that supports a plurality of mass storage chassis 304 with each mass storage chassis 304 supporting a plurality of disc drives 100. When determining an RV index for the mass storage unit, each of the plurality of disc drives adds to the total rotational vibration stimuli present in the mounting environment, i.e. each chassis 304. Depending on the ability of the mass storage unit to damp the effects of multiple disc drives, the mass storage unit 300 would be predicted to have poorer rotational vibration performance than a chassis of a personal computer with a lone disc drive 100.

FIG. 6 shows a server system 400 with a server system chassis 402 supporting a plurality of disc drives 100. As with the mass storage unit 300 (FIG. 5), the server system 400 is exposed to rotational vibration stimuli from each of the disc drives 100 mounted in its systems chassis 402.

Figure 7:
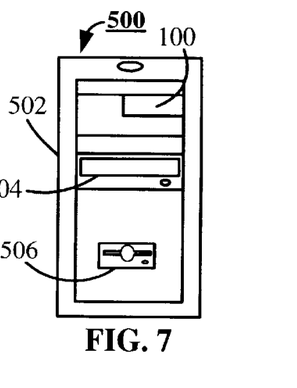
FIG. 7 is an elevational view of a computer system supporting the disc drive of FIG. 1.

FIG. 7 shows a computer system 500 with a computer system chassis 502 supporting a disc drive 100, an optical storage device 504 and an additional storage device 506. Again each of the devices and fans (not separately shown) in the computer system chassis contributes to rotational vibration stimuli experienced by the drive 100 mounted in the mechanical mounting environment, in this case the computer system chassis 502.

Figure 8:
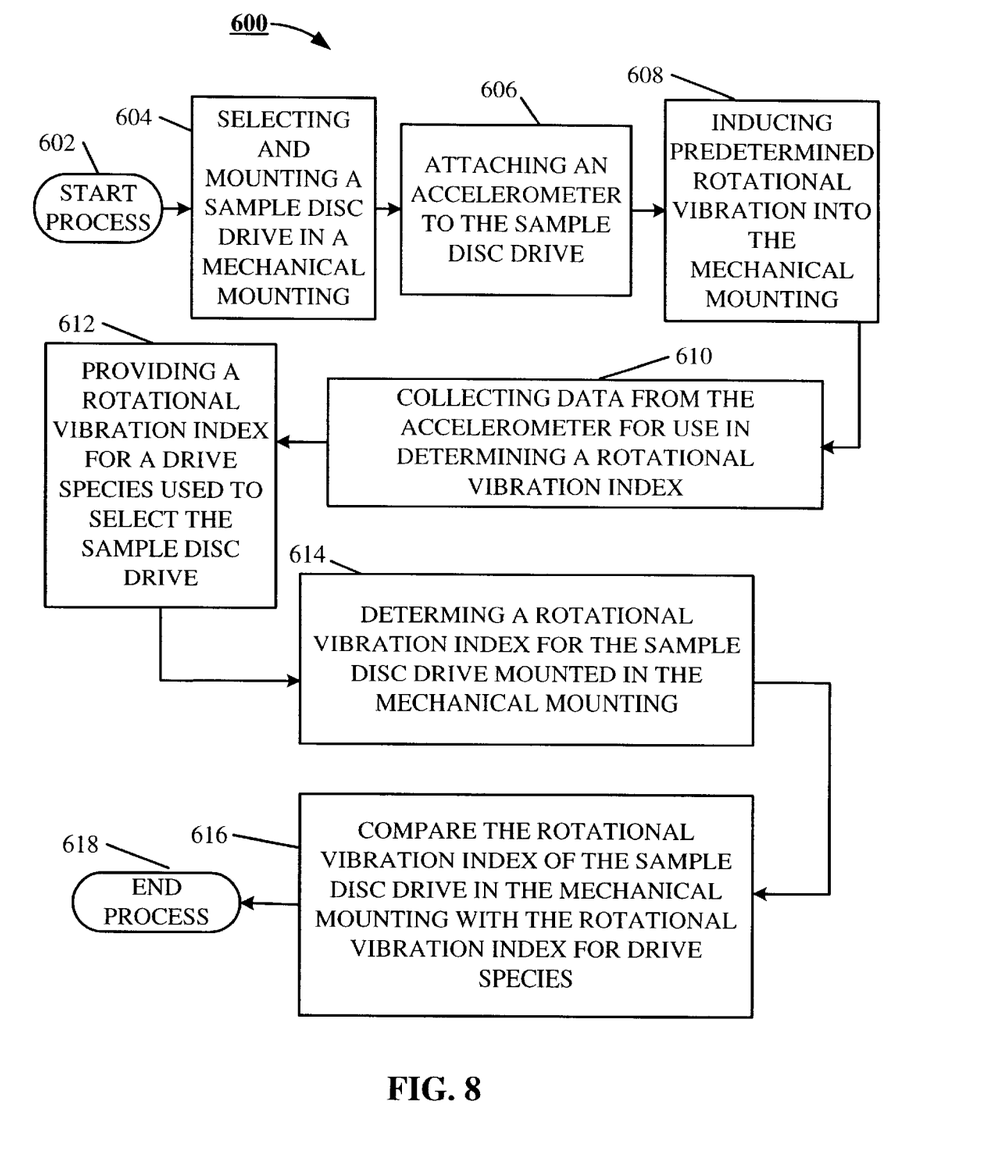
FIG. 8 is a flow diagram for determining a rotational vibration index for a mechanical mounting environment of a drive sample of the drive species of FIG. 3.

FIG. 8 shows a process flowchart 600 relating the rotational vibration stimuli of the mechanical mounting environment (such as 502) for the disc drive (such as 100) to performance of the disc drive, beginning at start process step 602 and continuing with process step 604. Process step 604 consists of selecting a sample disc drive (such as 100) from a drive species and mounting the sample disc drive into the mechanical mounting environment to determine a rotational vibration index for the mechanical mounting environment.

The process continues with process step 606 where an accelerometer is attached to the sample disc drive for measuring rotational vibration experienced by the disc drive during a disc drive function, such as reading data from a rotatable disc surface (such as 106) using a magnetoresistive read/write head (such as 118). At process step 608, a predetermined rotational vibration stimuli is induced into the mechanical mounting environment as a means for evaluating the response of the mechanical mounting environment to the predetermined rotational vibration stimuli. While the mechanical mounting environment is undergoing exposure to the induced rotational vibration stimuli, the accelerometer attached to the sample disc drive collects a reading for use in determining the rotational vibration index for the mechanical mounting environment at process step 610.

Next, at process step 612, a rotational vibration index for the drive species is provided for comparison with the determined rotational vibration index to be used as a predictor for the performance of the disc drive of the drive species mounted within the mechanical mounting environment. At process step 614, the rotational vibration index for the mechanical mounting environment supporting the sample disc drive is calculated, using an empirically derived rotational vibration function. The resulting rotational vibration index is germane to disc drives of the species from which the sample disc drive was selected. For other species of disc drives, the rotational vibration index of the mechanical mounting environment may not be the same as that found for the drive species tested.

A comparison of the rotational vibration index calculated in process step 614 is compared to the drive species rotational vibration index provided in process step 612. The comparison takes place at process step 616 and the process concludes with process step 618.

It should be noted that the drive species rotational vibration index is empirically determined through vibration testing of the drive species across a plurality of mechanical mounting environments. Typically, the predetermined rotational vibration stimuli applied to the mechanical mounting environment at process step 608 is applied by a predetermined seek algorithm. Both an alternate full stroke seek and an x-n (x to n) seek algorithm have been found to be useful. An x-n seek algorithm begins at a predetermined data track (such as 120) and proceeds to sequentially seek to, and returns from, all other data tracks on the rotatable disc surface, and then proceeds to a next predetermined data track to repeat the process until each track on a rotatable disc surface has served as the x track.

Figure 9:
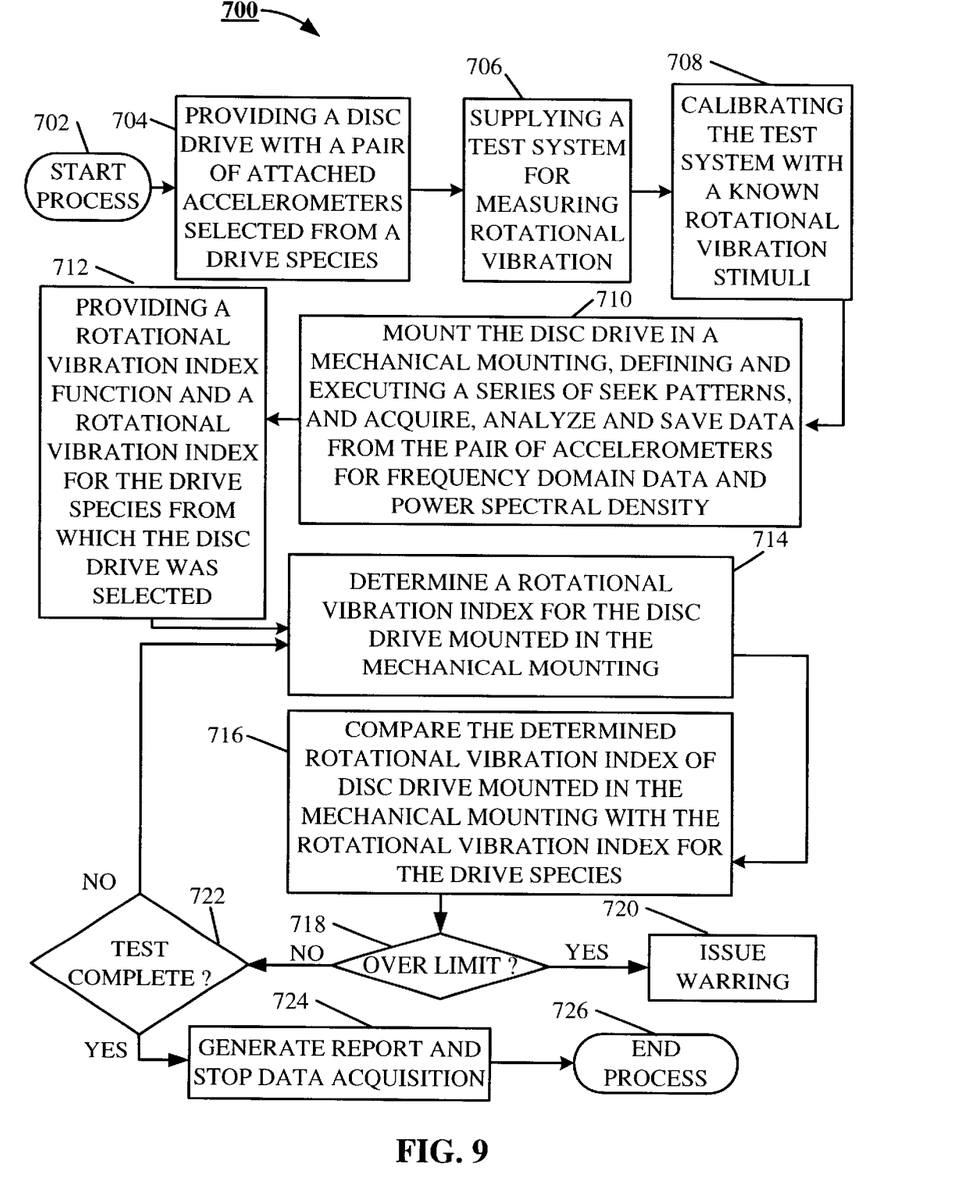
FIG. 9 is flow diagram for determining a rotational vibration index for the test system of FIG. 4.

Turning to FIG. 9, a method for predicting performance of the disc drive (such as 100) of a drive species mounted in a mechanical mounting environment (such as 206) is shown by a rotational vibration index process flowchart 700. The predicted performance of the disc drive is based on a rotational vibration index derived from a measurement of an induced rotational vibration stimulus of the mechanical environment. The method begins at start process step 702 and continues with process step 704. The disc drive selected from the drive species is provided at process step 704. The disc drive includes a pair of attached translational accelerometers 138 for capturing and reporting rotational vibration experienced by the disc drive mounted in the mechanical mounting environment. The process continues with process step 706 where a test system is supplied for measuring the rotational vibration experienced by the disc drive mounted in the mechanical mounting environment. The test system is calibrated, in process step 708, prior to collecting rotational vibration measurements to assure substantial accuracy of the measurement made by the accelerometers measuring the induced rotational vibration stimulus applied to the mechanical mounting environment.

The rotational vibration index process flow chart 700 continues with process step 710, which involves mounting the disc drives provided by process step 704 in the mechanical mounting environment, defining and executing a series of seek patterns to impart the induced rotational vibration stimulus to the mechanical mounting environment while acquiring, analyzing and saving the measurements made by the accelerometers measuring the induced rotational vibration stimulus of the mechanical mounting environment as experienced by the disc drive.

Continuing with process step 712, a rotational vibration index function and a rotational vibration index for the drive species from which the disc drive was selected are provided to allow a computational determination of a rotational vibration index within process step 714. The rotational vibration index calculated by step 714 is an index for the mechanical mounting environment supporting the disc drive for the species of disc drive mounted in the mechanical mounting environment and is compared to the rotational vibration index provided by step 712 in process step 716.

A decision point occurs at process step 718 where a comparison of the computed rotational vibration index for the mechanical mounting environment is made with the rotational vibration index of the drive species to determine whether the computed rotational vibration index for the mechanical mounting environment is greater than, or less than, the rotational vibration index for the drive species.

When computed rotational vibration indices are found to be greater than the rotational vibration index of the drive species, a warning is issued at process step 720 reporting the occurrence of the event. For those computed rotational vibration indices found to be within a rotational vibration index of the drive species, the process continues at process step 722, where status of the process is checked.

The determination made at process step 722 is whether or not the series of seek patterns defined in process step 710 have been completed. If all seek patterns have been executed, the process continues at process step 724, where a report of the data collected during the process is generated and acquisition of data ceases. If seek patterns defined in process step 710 remain to be executed, the process returns to process step 714 and cycles through each of the remaining seek patterns. Upon completion of all seek patterns, the process concludes with process step 726.

In accordance with one aspect of a preferred embodiment, an apparatus and associated method for relating rotational vibration stimuli of a mechanical mounting environment for a disc drive is provided which includes the steps of selecting and mounting a sample disc drive of a drive species into the mechanical mounting environment (such as step 604); attaching an accelerometer to the sample disc drive for measuring rotational vibration experienced by the disc drive while the drive is executing disc drive operations (such as step 606); inducing a predetermined rotational vibration stimuli into the mechanical mounting environment to evaluate the mechanical mounting environments response to the predetermined rotational vibration stimuli (such as step 608); collecting data from the accelerometer for use in determining the rotational vibration index for the mechanical mounting environment (such as step 610); providing a rotational vibration index for the drive species for comparison with the determined rotational vibration index (such as step 612); determining the rotational vibration index for the mechanical mounting environment (such as step 614); and comparing the rotational vibration index calculated for the mechanical mounting environment with the rotational vibration index of the drive species to relate the rotational vibration stimuli of the mechanical mounting environment to the performance of the sample disc drive (such as step 616).

It is to be understood that even though numerous characteristics and advantages of various embodiments of the present invention have been set forth in the foregoing description, together with details of the structure and functions of various embodiments of the invention, and although preferred embodiments have been depicted and described in detail herein, modification, additions, substitutions and the like can be made by those skilled in the relevant art without deviating from the spirit of the invention and are therefore considered to be within the scope of the invention as defined in the appended claims.

What is claimed is:

1. A method for relating rotational vibration stimuli of a mechanical mounting environment for a disc drive to performance of the disc drive by steps comprising:

(a) mounting a sample disc drive selected from a drive species into the mechanical mounting environment;

(b) imparting a predetermined rotational vibration stimuli to the mechanical mounting environment;

(c) measuring a rotational vibration experienced by the sample disc drive mounted in the mechanical mounting environment responding to the predetermined rotational vibration stimuli of step (b);

(d) providing a predetermined rotational vibration index for the drive species;

(e) determining a rotational vibration index for the mechanical mounting environment with the sample disc drive mounted to the mechanical environment; and (f) comparing the rotational vibration index for the mechanical mounting environment with the sample disc drive mounted to the mechanical mounting environment with the predetermined rotational vibration index for the drive species to relate the rotational vibration stimuli of the mechanical mounting environment to the performance of the sample disc drive.

2. The method of claim 1 in which the mechanical mounting environment of step (a) is a system chassis, which accommodates at least one disc drive, wherein the system chassis is selected from a group comprising a computer system, a server system and a mass storage system.

3. The method of claim 1 in which the mechanical mounting environment of step (a) is a test system chassis.

4. The method of claim 1 in which the disc drive operation of step (b) is an execution of a predetermined seek algorithm selected from a group of seek algorithms comprising an alternate full stroke seek algorithm and an x-n seek algorithm.

5. The method of claim 1 in which the measurement of the rotational vibration experienced by the disc drive of step (c) is achieved through the use of an accelerometer.

6. The method of claim 1 in which step (c) comprising the steps of:

(c1) attaching an accelerometer to the sample disc drive for use in measuring a frequency and an amplitude of rotational vibration experienced by the sample disc drive mounted in the mechanical mounting environment;

(c2) supplying a computer with a data acquisition card communicating with the accelerometer for gathering, filtering, recording and displaying the frequency and the amplitude of rotation vibration experienced by the sample disc drive mounted in the mechanical mounting environment;

(c3) calibrating the computer with the data acquisition card communicating with the accelerometer to ensure signal integrity; and (c4) measuring a rotational vibration experienced by the disc drive responding to the predetermined rotational vibration stimuli of step (b).

7. The method of claim 1 in which the predetermined rotational vibration stimuli of step (b) is provided by a predetermined seek algorithm executed by the sample disc drive.

8. The method of claim 6 in which the sample disc drive includes a rotatable disc surface and an adjacent read/write head for writing data to and reading data from the rotatable disc surface and in which the predetermined rotational vibration stimuli of step (b) is provided by a predetermined seek algorithm executed by the sample disc drive and further wherein the measuring step (c4) comprises the steps of:

(a) gathering, filtering, recording and displaying a frequency and an amplitude of rotation vibration experienced by the sample disc drive mounted in the mechanical mounting environment responding to the predetermined rotational vibration stimuli using the calibrated computer with the data acquisition card communicating with the accelerometer; and (b) writing a predetermined data to the rotatable disc surface while gathering, filtering, recording and displaying a level of data through put and a level of non-recoverable errors encountered by the sample disc drive while writing the predetermined data to the rotatable disc surface, for use in determining the rotational vibration index for the mechanical mounting environment.

9. The method of claim 1 in which the rotational vibration index for the drive species of step (d) is provided by steps comprising:

(d1) selecting a first of a plurality of disc drives with a basedeck supporting a spindle motor assembly having an axis of rotation from the drive species and mounting a pair of accelerometers on the selected disc drive to detect a rotational vibration in the axis of rotation of the spindle motor assembly;

(d2) securing the selected disc drive to a vibration test fixture calibrated to provide vibration stimuli of selectable frequencies and power spectral densities to the selected disc drive, the vibration test fixture for use in establishing vibrational tolerance limits for the drive species;

(d3) choosing and applying a first rotational vibration having a predetermined frequency and power spectral density to the basedeck while performing data transfer operations for use in determining the rotational vibration index for the drive species;

(d4) increasing the power spectral density of the rotational vibration to a point that substantially all reported errors are recoverable errors to establish an upper limit tolerance of the selected disc drive for the frequency of the rotational vibration chosen;

(d5) selecting a subsequent rotational vibration having a predetermined frequency and power spectral density different from the first selected rotational vibration and applying the subsequent selected rotational vibration to the basedeck while performing data transfer operations for use in determining the rotational vibration index for the drive species; and (d6) repeating steps (d1) through (d5) across a predetermined frequency band for a predetermined number of disc drives selected from the drive species for use in determining an upper tolerance limit for power spectral density profile across the predetermined frequency band for use in determining a power spectral density profile specification across the predetermined frequency band for an individual disc drive of the drive species.

10. The method of claim 9 in which the rotational vibration index for the drive species of providing step (d) further comprises the steps of:

(d7) choosing a first of a plurality of the selected disc drives of the drive species for use in determining the rotational vibration index for the drive species;

(d8) attaching a pair of accelerometers to the first chosen selected disc drive to detect a rotational vibration in the axis of rotation of the spindle motor assembly and mounting the first chosen disc drive into a first of a plurality of chassis systems;

(d9) connecting the pair of accelerometers to a test system used to measure an energy level experienced by the first chosen selected disc drive resulting from an induced rotational vibration stimuli imparted on the first of the plurality of chassis;

(d10) imparting the induced rotational vibration stimuli on the first of the plurality of chassis systems by activating the first chosen selected disc drive to loop on an alternate full stroke seek cycles a predetermined number of the alternate full stroke seek cycles;

(d11) measuring and recording the energy level experienced by the first chosen selected disc drive resulting from the rotational vibration stimuli for each of the predetermined number of alternate full stroke seek cycles;

(d12) repeating steps (d7) through (d11) for each of the plurality of the selected disc drives mounted in each of the plurality of chassis for use in determining a rotational vibration index function used for evaluating the mechanical mounting environment in which the selected disc drives of the drive species are mounted; and (d13) correlating the measured energy level for each of the plurality of disc drives mounted in each of the plurality of chassis to generate the rotational vibration index function for the drive species.

11. The method of claim 1 in which the rotational vibration index for the drive species of step (d) is derived from a rotational vibration index function that is based on a power spectral density profile specification for an individual disc drive of the drive species, and in which the measurement of the rotational vibration experienced by the disc drive of step (c) is used to determine a power spectral density reading, and further in which the rotational vibration index for the mechanical mounting environment with the sample disc drive mounted to the mechanical mounting environment of step (e) is derived by steps comprising:

(e1) supplying the power spectral density reading to a processor programmed with the rotational vibration index function for use in deriving the rotational vibration index for the mechanical mounting environment;

(e2) providing to the processor the power spectral density specification for an individual disc drive of the drive species; and (e3) deriving the rotation vibration index for the mechanical mounting environment by applying the power spectral density reading and the power spectral specification to the rotational vibration index function and calculating the rotation vibration index for the mechanical mounting environment.

12. The method of claim 6 in which the data acquisition card of step (c2) is programmed with software for gathering, filtering, recording and displaying the frequency and the amplitude of rotation vibration experienced by the sample disc drive mounted in the mechanical mounting environment.

13. The method of claim 6 in which the computer with the data acquisition card communicating with the accelerometer of step (c3) is a test system, and in which the accelerometer is a pair of accelerometers, and further in which calibration of the test system comprises the steps of:

(a) applying power to the test system to determine operability of the pair of accelerometers;

(b) inducing a calibrated rotational vibration stimuli into the pair of accelerometers while monitoring the output signal from the accelerometers to determine a maximum peak value reported by each of the pair of accelerometers; and (c) comparing the maximum peak value reported by each of the accelerometers to the other by calculating a ratio of the maximum peak value reported by a first of the pair of accelerometers raised to the third power to the maximum peak value reported by a second of the pair of accelerometers raised to the third power and verifying the ratio is within predetermined limits of between about 0.10 and 99.

14. A method for predicting performance of a disc drive of a drive species mounted in a mechanical mounting environment, the predicted performance of the disc drive based on a rotational vibration index derived from a measurement of an induced rotational vibration stimulus of the mechanical mounting environment by steps comprising:

(a) providing the disc drive selected from the drive species, the disc drive having a pair of attached accelerometers for capturing and reporting a rotational vibration experienced by the disc drive mounted in the mechanical mounting environment;

(b) supplying a test system for measuring the rotational vibration experienced by the disc drive mounted in the mechanical mounting environment;

(c) calibrating the test system to assure substantial accuracy of the measurement made by the pair of accelerometers measuring the induced rotational vibration stimulus applied to the mechanical mounting environment;

(d) mounting the disc drive with attached accelerometers within the mechanical mounting environment, defining and executing a series of seek patterns to impart the induced rotational vibration stimulus to the mechanical mounting environment while acquiring, analyzing and saving the measurement made by the pair of accelerometers measuring the induced rotational vibration stimulus of the mechanical mounting environment;

(e) providing a rotational vibration index function for use in determining a rotational vibration index for the mechanical mounting environment, and providing a rotational vibration index for the drive species for use with the rotational vibration index function; and (f) computing a rotational vibration index for the mechanical mounting environment using the rotational vibration index function applied to the saved measurement taken by the pair of accelerometers of the induced rotational vibration stimulus of the mechanical mounting environment.

15. The method of claim 14 further having steps comprising:

(g) comparing the computed rotational vibration index for the mechanical mounting environment with the rotational vibration index for the drive species;

(h) determining if the computed rotational vibration index of the disc drive mounted in the mechanical mounting environment is greater than the rotational vibration index for the drive species and issuing a warning for the computed rotational vibration index of the disc drive mounted in the mechanical mounting environment greater than the rotational vibration index for the drive species;

(i) deciding if each of the series of seek patterns of mounting step (d) has been executed and repeating steps (d) through (h) for each seek pattern remaining to be executed; and (j) generating a report predicting performance of the disc drive of the drive species mounted in a mechanical mounting environment.

16. The method of claim 15 in which the disc drive of generating step (j) is selected from a plurality of disc drives of the drive species.

17. The method of claim 15 in which the test system of supplying step (b) comprises:

a computer with a data acquisition card communicating with the pair of accelerometers of providing step (a), the data acquisition card for acquiring and analyzing the measurement made by the pair of accelerometers of the induced rotational vibration stimulus of the mechanical mounting environment;

a storage device communicating with the computer for saving the measurement made by the pair of accelerometers of the induced rotational vibration stimulus of the mechanical mounting environment; and software incorporating the rotational vibration index function of providing step (e) programmed into the computer and communicating with the data acquisition to compute the rotational vibration index for the mechanical mounting environment.

18. The method of claim 14 in which the rotational vibration index for the disc drive with attached accelerometers of step (f) is computed by steps comprising:

(f1) providing a power spectral density profile for the drive species across a predetermined frequency range for use in determining the rotational vibration index for the mechanical mounting environment;

(f2) determining a power spectral density profile of the rotational vibration stimulus imparted on the mechanical mounting environment at each measured frequency response of the rotational vibration stimulus using the software incorporating the rotational vibration index function;

(f3) calculating and combining a different power term of each of the power spectral density profile of the rotational vibration stimulus imparted on the mechanical mounting environment and the power spectral density profile for the drive species at each and for all measured frequency responses of the rotational vibration stimulus;

(f4) finding a ratio of a square root of an area under the power spectral density profile of the rotational vibration stimulus to a square root of an area under the power spectral density profile of the drive species; and (f5) computing the rotational vibration index on log scale from the ratio of a square root of the area under the power spectral density profile of the rotational vibration stimulus to the square root of the area under the power spectral density profile of the drive species and the combined sum difference powered term for all measured frequency responses of the rotational vibration stimulus.

19. A test system for predicting the performance of a disc drive of a drive species mounted in a mechanical mounting environment comprising;

a pair of accelerometers attached to the disc drive for measuring a response of the disc drive to a rotational vibration stimuli imparted on the mechanical mounting environment;

a computer with a data acquisition card communicating with the pair of accelerometers, the data acquisition card for acquiring and analyzing the response of the disc drive to the rotational vibration stimuli imparted on the mechanical mounting environment as measured by the pair of accelerometers;

a storage device communicating with the computer for saving the measurements made by the pair of accelerometers measuring the response of the disc drive to the rotational vibration stimuli imparted on the mechanical mounting environment; and software incorporating a rotational vibration index function programmed into the computer and communicating with the data acquisition card to compute a rotational vibration index for the mechanical mounting environment by steps for computing the rotational vibration index for the mechanical mounting environment.

20. The test system of claim 19 in which the steps for computing the rotational vibration index for the mechanical mounting environment are steps comprising:

(a) mounting the disc drive of the drive species into the mechanical mounting environment to determine the rotational vibration index for the mechanical mounting environment;

(b) attaching the pair of accelerometers to the disc drive to measure the response of the disc drive to the rotational vibration stimuli imparted on the mechanical mounting environment;

(c) inducing a predetermined rotational vibration stimuli into the mechanical mounting environment to evaluate the mechanical mounting environment's response to the predetermined rotational vibration stimuli;

(d) collecting data from the pair of accelerometers attached to the disc drive for use in determining a rotational vibration index for the mechanical mounting environment;

(e) providing a rotational vibration index for the drive species for comparison with the determined rotational vibration index; and (f) determining and comparing the rotational vibration index for the mechanical mounting environment with the rotational vibration index of the drive species to relate the rotational vibration stimuli of the mechanical mounting environment to the performance of the disc drive.

21. The test system of claim 20 in which the mechanical mounting environment of step (a) is a system chassis, which accommodates at least one disc drive, wherein the system chassis is selected from a group comprising a computer system, a server system and a mass storage system.

22. The test system of claim 20 in which the mechanical mounting environment of step (a) is a test system chassis.

23. The test system of claim 20 in which the disc drive operation of step (b) is an execution of a predetermined seek algorithm selected from a group of seek algorithms comprising an alternate full stroke seek algorithm and an x-n seek algorithm.

24. The test system of claim 20 in which the disc drive operation of step (b) is execution of a data write operation.

25. The test system of claim 20 in which step (b) comprises the steps of:

(b1) providing and attaching the pair of accelerometers to the disc drive for use in measuring a frequency and an amplitude of rotation vibration experienced by the disc drive mounted in the mechanical mounting environment;

(b2) supplying a computer with a data acquisition card communicating with the pair of accelerometers for gathering, filtering, recording and displaying the frequency and the amplitude of rotational vibration experienced by the sample disc drive mounted in the mechanical mounting environment;

(b3) calibrating the computer with the data acquisition card communicating with the accelerometer to ensure signal integrity; and (b4) securing the sample disc drive within the mechanical mounting environment for use in relating rotational vibration stimuli of a mechanical mounting environment to the performance of the disc drive.

26. The test system of claim 20 in which the predetermined rotational vibration stimuli of inducing step (c) is provided by a predetermined seek algorithm executed by the disc drive.

27. The test system of claim 20 in which the disc drive of step (d) includes a rotatable disc surface and an adjacent read/write head for writing data to and reading data from the rotatable disc surface and in which the predetermined rotational vibration stimuli of inducing step (c) is provided by a predetermined seek algorithm for the sample disc drive and further wherein the collecting step (d) comprises the steps of:

(d1) gathering, filtering, recording and displaying the frequency and the amplitude of rotational vibration experienced by the sample disc drive mounted in the mechanical mounting environment resulting from the predetermined rotational vibration stimuli using the calibrated computer with the data acquisition card communicating with the accelerometer; and (d2) writing a predetermined data to the rotatable disc surface while gathering, filtering, recording and displaying a level of data throughput and the level of non-recoverable errors encountered by the sample disc drive while writing the predetermined data to the rotatable disc surface, for use in determining the rotational vibration index for the mechanical mounting environment.

28. The test system of claim 20 in which the rotational vibration index for the drive species of step (e) is provided by steps comprising:

(e1) selecting a first of a plurality of disc drives with a basedeck supporting a spindle motor assembly having an axis of rotation from the drive species and mounting a pair of accelerometers on the selected disc drive to detect a rotational vibration in the axis of rotation of the spindle motor assembly;

(e2) securing the selected disc drive to a vibration test fixture calibrated to provide vibration stimuli of selectable frequencies and power spectral densities to the selected disc drive, the vibration test fixture for use in establishing vibrational tolerance limits for the drive species;

(e3) choosing and applying a first rotational vibration having a predetermined frequency and power spectral density to the basedeck while performing data transfer operations for use in determining the rotational vibration index for the drive species;

(e4) increasing the power spectral density of the rotational vibration to a point that all reported errors are recoverable errors to establish an upper limit tolerance of the selected disc drive for the frequency of the rotational vibration chosen;

(e5) selecting a subsequent rotational vibration having a predetermined frequency and power spectral density different from the first selected rotational vibration and applying the subsequent selected rotational vibration to the basedeck while performing data transfer operations for use in determining the rotational vibration index for the drive species; and (e6) repeating steps (e1) through (e5) across a predetermined frequency band for a predetermined number of disc drives selected from the drive species for use in determining an upper tolerance limit for a power spectral density profile across the predetermined frequency band for use in determining a power spectral density profile specification across the predetermined frequency band for an individual disc drive of the drive species.

29. The test system of claim 28 in which the rotational vibration index for the drive species of step (e) further comprises the steps of:

(e7) choosing a first of a plurality of the selected disc drives of the drive species for use in determining the rotational vibration index for the drive species;

(e8) attaching the pair of accelerometers on the first chosen disc drive to detect a rotational vibration in the axis of rotation of the spindle motor assembly and mounting the first chosen disc drive into a first of a plurality of chassis systems;

(e9) connecting the pair of accelerometers to the computer with a data acquisition card to measure an energy level experienced by the chosen disc drive resulting from an induced rotational vibration stimuli imparted on the first of the plurality of chassis;

(e10) imparting the induced rotational vibration stimuli on the first of the plurality of chassis systems by activating the chosen disc drive to loop on an alternate full stroke seek cycle for a predetermined number of the alternate full stroke seek cycles;

(e11) measuring and recording the energy level experienced by the chosen disc drive resulting from the rotational vibration stimuli for each of the predetermined number of alternate full stroke seek cycles;

(e12) repeating steps (e7) through (e11) for each of the plurality of the selected disc drives mounted in each of the plurality of chassis for use in determining a rotational vibration index function used for evaluating the mechanical mounting environment in which the selected disc drives of the drive species are mounted; and (e13) correlating the measured energy level for each of the plurality of disc drives mounted in each of the plurality of chassis to generate the rotational vibration index function for the drive species.

30. The test system of claim 20 in which the rotational vibration index for the drive species of step (e) is derived from a rotational vibration index function that is based on a power spectral density profile specification for an individual disc drive of the drive species, and in which the data from the pair of accelerometers of step (d) is used to determine a power spectral density reading, and further in which the rotational vibration index for the mechanical mounting environment of step (f) is derived by steps comprising:

(f1) supplying the power spectral density reading to a processor programmed with the rotational vibration index function for use in deriving the rotational vibration index for the mechanical mounting environment;

(f2) providing to the processor the power spectral density specification for the individual disc drive; and (f3) deriving the rotation vibration index for the mechanical mounting environment by applying the power spectral density reading and the power spectral density specification to the rotational vibration index function and calculating the rotation vibration index for the mechanical mounting environment.

* * * * *